Patented Nov. 8, 1932

1,886,538

UNITED STATES PATENT OFFICE

EMIL C. FANTO, OF FAIRFIELD, CONNECTICUT, ASSIGNOR TO McKESSON & ROBBINS, INC., OF BRIDGEPORT, CONNECTICUT, A CORPORATION OF MARYLAND

METHOD OF PREPARING HEPTALDEHYDE

No Drawing. Original application filed April 24, 1929, Serial No. 357,885. Divided and this application filed June 10, 1930. Serial No. 460,300.

The present application relates to the production of a new medicinal preparation which may be administered either internally or externally as an antiseptic and disinfectant. This compound has a highly selective action against staphylococcus aureus, as well as against the B. pneumococcus and the streptococcus hemolyticus. It is susceptible of administration either in suitable solution as aqueous alcohol or other organic solvents or in vegetable or mineral oils, or as the active ingredient of salves, ointments, liniments or sprays.

The present application is a division of my co-pending application, Serial Number 357,885 filed April 24, 1929. The parent application is directed to the new product, normal heptyl phenol, described therein and to the process of its manufacture. This process includes a new method of treatment of castor oil and the subsequent treatment of the products obtained from the castor oil to produce heptyl alcohol which in turn is caused to react with phenol to provide the new product, normal heptyl phenol.

The present application is directed to that part of the process which results in the formation of heptyl alcohol, preferably normal heptyl alcohol, and includes as one of the essential features of novelty, the destructive distillation of the castor oil preferably under reduced pressure. The distillate obtained by this step consists of heptaldehyde with possibly an admixture of heptyl alcohol and perhaps other products. This product is then treated so as to convert the heptaldehyde into heptyl alcohol. The material is then washed, filtered and distilled, preferably in a vacuum still, thereby obtaining the normal heptyl alcohol, which is subsequently treated with phenol to obtain the normal heptyl phenol.

The following is a detailed description of my process, it being understood, however, that such detailed description of the process is submitted merely for purposes of illustration and is not to serve as a limitation of the scope of the invention.

1000 lbs. of castor oil are placed in a vacuum still provided with a stirrer and subjected to a destructive distillation under reduced pressure of 30 to 40 mm. mercury. Distillation is continued until distillate is no longer collected at a temperature varying from 270–300° C. The crude distillate so collected is placed in preferably an enamelled still having a fractionating column and the fraction distilling over between 147–165° C. collected. This fraction weighs approximately 100 lbs.

The next step is to reduce this material, and to accomplish this, the distillate obtained is mixed with iron turnings and diluted acetic acid, 1–1, and placed in a steam jacketed still having a mechanical stirrer and reflux condenser. The still is then heated by steam and the reduction accompanied by agitation is continued for six to seven hours. This reduction is of the general type

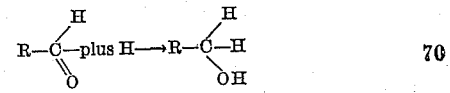

where R is an alkyl group. Any set of reducing agents which will furnish a convenient supply of H may be used such as iron or zinc with diluted acids. The mixture is then allowed to settle and the oily layer siphoned off, washed twice with hot 10% sodium hydroxide solution, and then several times with hot water until it is free from alkali. The water is then separated and the oil filtered over a bed of fused sodium sulphate. The dried filtrate is then distilled in a vacuum still and the fraction collected which passes over at a temperature range of 67–71° C. at 9 mm.

The now purified distillate consisting of normal heptyl alcohol is combined with phenol and for this purpose is passed to an autoclave-still provided with a reflux condenser and a strong mechanical agitator. Here it is heated to boiling for four hours with an equal amount of phenol and two to three times its weight of fused zinc chlorid. After cooling the reaction mixture to about 100° C., the same is washed three times with live steam.

The washed phenol mixture is fractionally distilled under vacuum and the fraction distilling between 124–137° C. at 8 mm. pressure is separately collected and consists of 100 pounds crude normal heptyl phenol which by repeated redistillation is obtained in a pure state. This is a colorless, oily liquid of pleasant, aromatic odor and has valuable germicidal and therapeutic properties.

I claim:

The method of preparing heptaldehyde comprising the steps of subjecting castor oil to destructive distillation under a pressure of substantially thirty to forty mm. of mercury, collecting the distillate produced at the temperatures below 300° C., subjecting said distillate to fractionation and collecting the fraction covering the range from 147° C. to 165° C.

In testimony whereof I have affixed my signature to this specification.

EMIL C. FANTO.